(12) United States Patent  
Kim et al.

(10) Patent No.: US 7,848,586 B2  
(45) Date of Patent: *Dec. 7, 2010

(54) SYSTEM, MEDIUM, AND METHOD ENCODING AND/OR DECODING IMAGE DATA

(75) Inventors: Wooshik Kim, Yongin-si (KR); Hyun Mun Kim, Seongnam-si (KR); Daesung Cho, Seoul (KR); Dmitri Birinov, Yongin-si (KR); Daehee Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

This patent is subject to a terminal disclaimer.

(21) Appl. No.: 11/484,699

(22) Filed: Jul. 12, 2006

(65) Prior Publication Data

US 2007/0019871 A1  Jan. 25, 2007

(30) Foreign Application Priority Data

Jul. 12, 2005  (KR) .................. 10-2005-0062932  
Jul. 6, 2006  (KR) .................. 10-2006-0063532

(51) Int. Cl.  
G06K 9/36  (2006.01)  
G06K 9/38  (2006.01)  
G06K 9/46  (2006.01)

(52) U.S. Cl. .................. 382/251; 382/232; 382/233; 382/239; 382/248; 382/250

(58) Field of Classification Search .................. 382/232, 382/233, 239, 248, 250, 251  
See application file for complete search history.

(56) References Cited

U.S. PATENT DOCUMENTS

| 5,115,309 A | * | 5/1992 | Hang | .................. 348/388.1 |
| 5,621,466 A | | 4/1997 | Miyane et al. | |
| 5,638,126 A | * | 6/1997 | Lim | .................. 375/240.03 |
| 5,781,561 A | | 7/1998 | Machida et al. | |
| 5,892,847 A | | 4/1999 | Johnson | |

(Continued)

FOREIGN PATENT DOCUMENTS

WO   WO98/35503   8/1998

(Continued)

OTHER PUBLICATIONS

International Search Report dated and mailed on Oct. 18, 2006, and issued in correspondence to International Application No. PCT/KR2006/002744.

(Continued)

*Primary Examiner*—Samir A. Ahmed  
*Assistant Examiner*—Li Liu  
(74) *Attorney, Agent, or Firm*—Staas & Halsey LLP (57) ABSTRACT

A system, medium, and method encoding and/or decoding image data. The image data encoding may include a transformer transforming pixel values of an image in the time domain to pixel values in the frequency domain, a quantization coefficient determiner determining a quantization coefficient corresponding to the number of bits per pixel of the image by adjusting a quantization variable defined by a user, a quantization unit quantizing the pixel values transformed by the transformer based on the quantization coefficient determined by the quantization coefficient determiner, and an entropy encoder generating a bitstream of the quantized pixel values.

36 Claims, 4 Drawing Sheets

U.S. PATENT DOCUMENTS

| | | | |
|---|---|---|---|
| 6,091,856 A | 7/2000 | Terane et al. | |
| 6,111,991 A * | 8/2000 | Ribas-Corbera et al. | 382/251 |
| 6,445,739 B1 | 9/2002 | Shen et al. | |
| 6,501,793 B2 | 12/2002 | Shen et al. | |
| 6,532,262 B1 * | 3/2003 | Fukuda et al. | 375/240.03 |
| 6,738,423 B1 | 5/2004 | Lainema et al. | |
| 6,865,224 B1 * | 3/2005 | Knee et al. | 375/240.03 |
| 7,010,035 B2 | 3/2006 | Shen et al. | |
| 7,295,609 B2 * | 11/2007 | Sato et al. | 375/240.03 |
| 7,492,820 B2 * | 2/2009 | Puri | 375/240.03 |
| 2003/0105788 A1 | 6/2003 | Chatterjee | |
| 2003/0128756 A1 | 7/2003 | Oktem | |
| 2005/0036699 A1 | 2/2005 | Holcomb et al. | |
| 2005/0276501 A1 | 12/2005 | Nakayama et al. | |
| 2006/0110051 A1 | 5/2006 | Kondo et al. | |
| 2006/0257034 A1 * | 11/2006 | Gish et al. | 382/239 |
| 2007/0147510 A1 | 6/2007 | Asad et al. | |
| 2008/0075166 A1 * | 3/2008 | Gish et al. | 375/240.13 |
| 2009/0003438 A1 * | 1/2009 | Kottke et al. | 375/240.03 |

FOREIGN PATENT DOCUMENTS

| | | |
|---|---|---|
| WO | WO2004/047454 | 6/2004 |

OTHER PUBLICATIONS

Nguyen, Performance Analysis of H.263 Video Encoder for Viram, Nov. 1999, University of California at Berkeley.

Barnett, Basis Concepts and Techniques of Video Coding and the H.261 Standard, 2000, Handbook of Image and Video Processing, Second Edition, Chapter 6.1, pp. 777-797.

U.S. Appl. No. 11/482,036 filed Jul. 7, 2006, Wookshik Kim et al., Samsung Electronics Co., Ltd.

U.S. Office Action mailed Aug. 19, 2009, issued in U.S. Appl. No. 11/482,036.

U.S. Office Action mailed Mar. 17, 2010, issued in U.S. Appl. No. 11/482,036.

* cited by examiner

SYSTEM, MEDIUM, AND METHOD ENCODING AND/OR DECODING IMAGE DATA

CROSS-REFERENCE TO RELATED APPLICATIONS

This application claims the priority benefit of Korean Patent Application Nos. 10-2005-0062932 and 10-2006-0063532, filed Jul. 12, 2005 and Jul. 6, 2006, respectively, in the Korean Intellectual Property Office, the disclosures of which are incorporated herein by reference.

BACKGROUND OF THE INVENTION

1. Field of the Invention

Embodiments of the present invention relate to encoding and/or decoding of image data, and more particularly, to a system, medium, and method encoding and/or decoding image data using adaptive quantization based on the number of bits per pixel in an input image.

2. Description of the Related Art

An image acquired by a camera may be displayed with an appropriate size, e.g., with a number of pixels, through sampling. When the image is displayed, the number of bits required to represent the value of each pixel is determined. Here, to display the image with high image quality, there has been a requirement to increase of the number of representable values, thereby increasing the number of bits per pixel. The number of bits has gradually increased also due to the advancing development of image devices. For example, although 8 bits have been used in many fields, recently, 10 or 12 bits have been used in application fields where high quality images are desired.

For conventional image compression, compression schemes for 8-bit images have been generally developed. For example, VC-1 (VC-1 Compressed Video Bitstream Format and Decoding Process), corresponding to a compression video codec standardized by the Society of Motion Picture and Television Engineers (SMPTE), provides effective quantization schemes suitable for every case using various kinds of image information. However, in the conventional quantization schemes used in VC-1, the number of bits per pixel is fixed to 8 bits per pixel. Although an 8-bit image is popularly used for image coding schemes, the image quality of the 8-bit image is limited. Thus, considering the gradual increase in the demand for images having higher image quality, the present inventors have found that it is desirable to provide a quantization scheme suitable even for a images having more than 8 bits per pixel.

SUMMARY OF THE INVENTION

Embodiments of the present invention provide a system, medium, and method for encoding and/or decoding image data to obtain a high quality image at a high compression ratio by automatically performing adaptive quantization according to the number of bits per pixel.

Additional aspects and/or advantages of the invention will be set forth in part in the description which follows and, in part, will be apparent from the description, or may be learned by practice of the invention.

To achieve the above and/or other aspects and advantages, embodiments of the present invention include an image data encoding system, including a quantization coefficient determiner to determine a quantization coefficient corresponding to a number of bits per pixel of an image being encoded by adjusting a quantization variable, a quantization unit to quantize pixel values based on the quantization coefficient, and an entropy encoder generating a bitstream of the quantized pixel values.

The system may further include a transformer to transform pixel values of the image in a time domain to the pixel values in a frequency domain and to output the pixel values to the quantization coefficient determiner for determining of the quantization coefficient.

The quantization coefficient determiner may adjust a range of quantization variables based on a range of pixel values that is extended according to a change in the number of bits per pixel.

In addition, the quantization coefficient determiner may determine the quantization coefficient based on the adjusted range of quantization variables.

The quantization coefficient determiner may further determine the quantization coefficient so that an existing quantization step, according to the number of bits per pixel, is maintained constant regardless of the change in the number of bits per pixel.

The quantization coefficient determiner may still further determine the quantization coefficient by adding a value proportional to the extended range of pixel values to the quantization variable or by multiplying the quantization variable by a value proportional to the extended range of pixel value values.

In addition, the quantization coefficient determiner may determine the quantization coefficient according to the change in the number of bits by linearly mapping a quantization coefficient for a quantization variable before being adjusted with the adjusted quantization variable.

The quantization variable may further be defined by a user.

To achieve the above and/or other aspects and advantages, embodiments of the present invention include a system, including a quantization coefficient determiner to determine a quantization coefficient corresponding to a number of bits per pixel of an image by adjusting a quantization variable, and a quantization unit to quantize or dequantize pixel values based on the quantization coefficient.

The system may further include a transformer to transform pixel values of the image in a time domain to the pixel values in a frequency domain and to output the pixel values to the quantization coefficient determiner for determining of the quantization coefficient.

The system may be an encoder system, with the system further including a bitstream generator to generate the bitstream with the quantized pixel values.

In addition, the system may be a decoder system, and the quantization unit may be a dequantization unit that dequantizes the pixel values, with the system further including an entropy decoder to decode a bitstream containing the pixel values of the image.

To achieve the above and/or other aspects and advantages, embodiments of the present invention include an image data decoding system, including an entropy decoder to decode a bitstream of pixel values of an image, a quantization coefficient determiner to determine a quantization coefficient corresponding to a number of bits per pixel of the image by adjusting a quantization variable, and a dequantization unit to dequantize pixel values decoded by the entropy decoder based on the determined quantization coefficient.

The system may further include a detransformer to detransform the dequantized pixel values from a frequency domain into a time domain.

The quantization coefficient determiner may further adjust a range of quantization variables based on a range of pixel values that is extended according to a change in the number of bits per pixel.

The quantization coefficient determiner may determine the quantization coefficient based on the adjusted range of quantization variables.

In addition, the quantization coefficient determiner may determine the quantization coefficient so that an existing quantization step, according to the number of bits per pixel, is maintained constant regardless of the change in the number of bits per pixel.

The quantization coefficient determiner may still further determine the quantization coefficient by adding a value proportional to the extended range of pixel values to the quantization variable or by multiplying the quantization variable by a value proportional to the extended range of pixel values.

The quantization coefficient determiner may determine the quantization coefficient according to the change in the number of bits by linearly mapping a quantization coefficient for a quantization variable before being adjusted with the adjusted quantization variable.

In addition, the dequantization unit may dequantize the pixel values based on the quantization coefficient adjusted according to the number of bits per pixel in the quantization coefficient determiner.

Here, the quantization variable may be defined by a user.

To achieve the above and/or other aspects and advantages, embodiments of the present invention include an image data encoding method, including determining a quantization coefficient corresponding to a number of bits per pixel of an image by adjusting a quantization variable, quantizing pixel values of the image based on the determined quantization coefficient, and generating a bitstream of the quantized pixel values.

The method may further include transforming pixel values of the image in a time domain to the pixel values in a frequency domain for the determining of the quantization coefficient.

In the determining of the quantization coefficient, a range of quantization variables may be adjusted based on a range of pixel values that is extended according to a change in the number of bits per pixel.

Here, in the determining of the quantization coefficient, the quantization coefficient may be determined based on the adjusted range of quantization variables.

Further, in the determining of the quantization coefficient, the quantization coefficient may be determined so that an existing quantization step, according to the number of bits per pixel, is maintained constant regardless of the change in the number of bits per pixel.

Still further, in the determining of the quantization coefficient, the quantization coefficient may be determined by adding a value proportional to the extended range of pixel values to the quantization variable or by multiplying the quantization variable by a value proportional to the extended range of pixel values.

In the determining of the quantization coefficient, the quantization coefficient according to the change in the number of bits may be determined by linearly mapping a quantization coefficient for a quantization variable before being adjusted with the adjusted quantization variable.

The quantization variable may further be defined by a user.

To achieve the above and/or other aspects and advantages, embodiments of the present invention include an image data decoding method, including decoding a bitstream of pixel values of an image, determining a quantization coefficient corresponding to a number of bits per pixel of the image by adjusting a quantization variable, and dequantizing the pixel values based on the determined quantization coefficient.

The method may further include detransforming the dequantized pixel values from a frequency domain into a time domain.

In the determining of the quantization coefficient, a range of quantization variables may be adjusted based on a range of pixel values that is extended according to a change in the number of bits per pixel.

Further, in the determining of the quantization coefficient, the quantization coefficient may be determined based on the adjusted range of quantization variables.

Still further, in the determining of the quantization coefficient, the quantization coefficient may be determined so that an existing quantization step, according to the number of bits per pixel, is maintained constant regardless of the change in the number of bits per pixel.

In addition, in the determining of the quantization coefficient, the quantization coefficient may be determined by adding a value proportional to the extended range of pixel values to the quantization variable or by multiplying the quantization variable by a value proportional to the extended range of pixel values.

In the determining of the quantization coefficient, the quantization coefficient according to the change in the number of bits may be determined by linearly mapping a quantization coefficient for a quantization variable before being adjusted with the adjusted quantization variable.

Here, in the dequantizing of the decoded pixel values, the pixel values may be dequantized based on the quantization coefficient adjusted according to the number of bits per pixel.

The quantization variable may further be defined by a user.

To achieve the above and/or other aspects and advantages, embodiments of the present invention include at least one medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
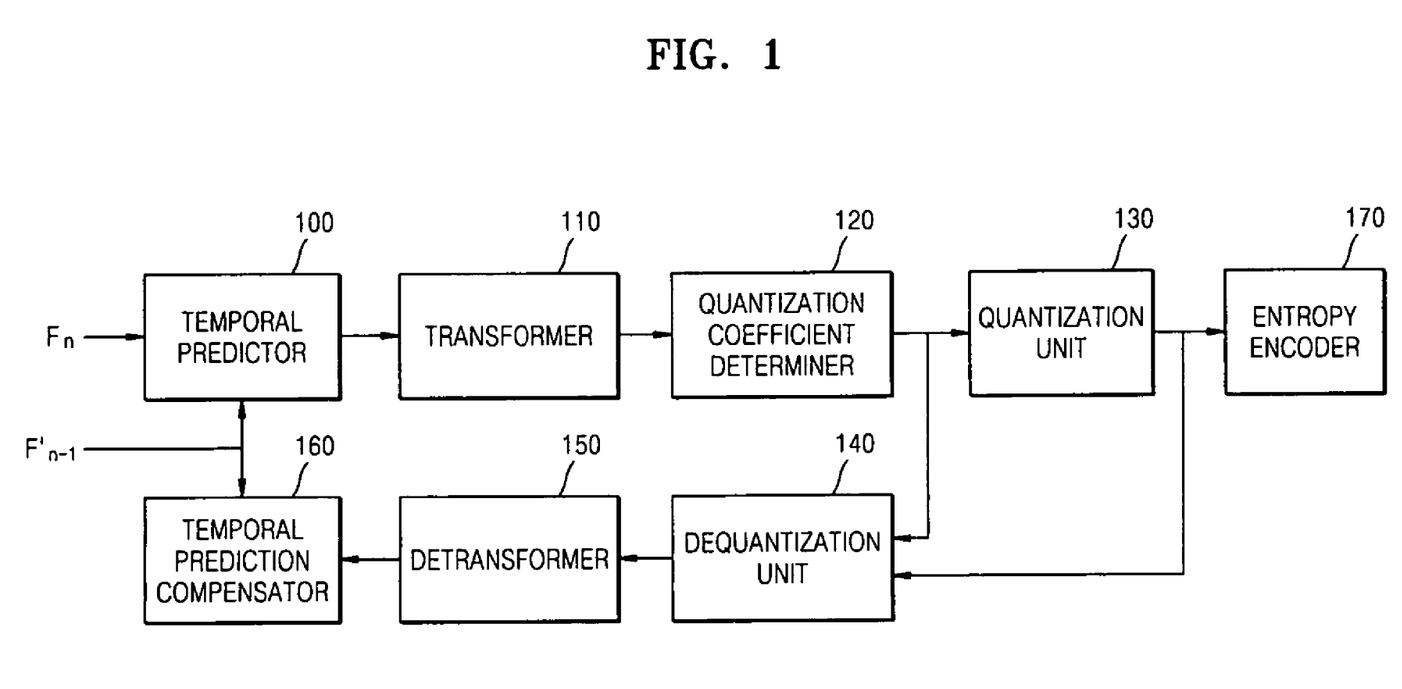
FIG. 1 illustrates an image data encoding system, according to an embodiment of the present invention.

FIG. 1 illustrates an image data encoding system, according to an embodiment of the present invention. Referring to FIG. 1, the image data encoding system may include a temporal predictor 100, a transformer 110, a quantization coefficient determiner 120, a quantization unit 130, a dequantization unit 140, a detransformer 150, a temporal prediction compensator 160, and an entropy encoder 170, for example.

The temporal predictor 100 temporally predicts pixel values of a current block using a previous block, in the time domain, and may output the prediction result to the transformer 110.

Further, the temporal predictor 100 predicts the current image frame $F_n$ by estimating motion in a previous image frame $F_{n-1}'$. That is, the temporal predictor 100 searches the previous frame $F_{n-1}'$ for a block similar to a current block, having a predetermined size, to be currently encoded and then subtracts pixel values of the previous block from pixel values of the current block. When a first frame is processed, this procedure is omitted since the previous block does not exist. In another way, the procedure can be omitted by a user to prevent random access and error propagation.

The transformer 110 transforms pixel values of an image in the time domain to pixel values in the frequency domain and outputs the transform result to the quantization coefficient determiner 120. Here, an orthogonal transform encoding method may be used as the transforming method, for example. Among orthogonal transform encoding methods, examples include a fast Fourier transform (FFT) method, a discrete cosine transform (DCT) method, a Karhunen Loeve transform (KLT) method, an Hadamard transform method, and slant transform method, which are widely used.

The pixel values transformed into the frequency domain, by the transformer 110, may be classified into a DC component corresponding to a low frequency domain and an AC component corresponding to a high frequency domain. Thus, the DC component references a transformed pixel value in the low frequency domain, which corresponds to coordinates (0,0), for example, and the AC component references the other pixel values.

According to an embodiment of the present invention, the quantization coefficient determiner 120 determines a quantization coefficient corresponding to the number of bits per pixel of the image by adjusting a quantization variable defined by the user and outputs the determination result to the quantization unit 130 and the dequantization unit 140.

Here, the quantization variable may be a value defined by the user, and the number (N) of bits per pixel of an image corresponds to the number of bits used to express a single pixel. The quantization coefficient means a quantization value used for quantization.

An objective of embodiments of the present invention is to determine a quantization value based on a change in the number of bits per pixel of an image. To this end, in an embodiment of the present invention, the quantization coefficient determiner 120 may adjust the range of quantization variables based on the range of pixel values that is extended based on the change in the number of bits per pixel. The extended range ($2^{(N-a)}$) of pixel values means the range of pixel values extended due to the changed pixel values. Here, in the extended range ($2^{(N-a)}$), "a" corresponds to the number of bits expressing an existing pixel. In an embodiment, the quantization coefficient determiner 120 determines a quantization coefficient so that an existing quantization step is maintained constant regardless of a change in the number of bits per pixel, for example.

When determining a new quantization coefficient based on the adjusted range of quantization variables and the change in the number of bits per pixel, the quantization coefficient determiner 120 may obtain the quantization coefficient by adding a value proportional to the extended range of pixel values to the quantization variable defined by the user, for example.

Hereinafter, the aforementioned VC-1 quantization will be used to explain an embodiment of the present invention. However, embodiments of the present invention are not limited thereto, noting that alternative embodiments are equally available.

As noted above, the quantization process of VC-1 is limited in that the number of bits per pixel of an input image is always 8 (i.e., a=8). In this case, the quantization variable, e.g., defined by the user, has a range of [1, 31]. Accordingly, it is desirable to make encoding possible even when the number of bits per pixel of the input image is larger than 8, e.g., through a process of adapting the quantization coefficient according to the number of bits per pixel, according to an embodiment of the present invention.

Thus, the current embodiment includes an adjusting of the range of the quantization variable based on N to determine the quantization coefficient, where N denotes the number of bits per pixel of the input image. In this case, the quantization coefficient may be maintained constant regardless of the variation of N. That is, since the quantization coefficient is maintained constant, the quantization step is constant. To quantize a pixel value indicated by N, under the condition of the same quantization step, the range of the quantization variable should be adjusted according to N. If it is assumed that the range of the quantization variable is [1, 31], when N is 8, and if it is assumed that the minimum value of the quantization variable is 1, with respect to N, the maximum value of the quantization variable can be obtained using the following Equation 1.

$$QP_{N\text{-}bit,MAX} = QP_{8\text{-}bit,MAX} \times 2^{(N-8)} = 31 \times 2^{(N-8)} \qquad \text{Equation 1}$$

Here, the range of the quantization variable with respect to N is $[1, 31 \times 2^{(N-8)}]$. If the range of the quantization variable is adjusted so that the maximum value of the quantization variable, with respect to N, is 31, the range of the quantization variable with respect to N would be $[1-31 \times (2^{(N-8)}-1), 31]$. In this case, to determine a value of the quantization coefficient, based on the quantization variable with respect to N, the further below equations may be used.

Accordingly, the quantization coefficient determiner 120 may determine a quantization coefficient by adding a value proportional to the extended range of pixel values to the quantization variable defined by the user. For example, the value proportional to the extended range of pixel values may be $31 \times (2^{(N-8)}-1)$, but is not limited thereto.

The quantization coefficient determiner 120 may determine a quantization coefficient in the low frequency domain using the below Equation 2, again noting that the low frequency domain indicates the DC component of the transformed pixel values.

Equation 2:

$$\begin{cases} QS = [QP + 31 \times (2^{(N-8)} - 1)] \times 2 & (QP < (3 - 31 \times (2^{(N-8)} - 1))) \\ QS = 8 & (QP = (3 - 31 \times (2^{(N-8)} - 1)) \text{ or } QP = (4 - 31 \times (2^{(N-8)} - 1))) \\ QS = ([QP + 31 \times (2^{(N-8)} - 1)]/2) + 6 & \text{(the other range)} \end{cases}$$

Here, QS corresponds to the quantization coefficient, QP corresponds to the quantization variable defined by the user, N corresponds to the number of bits per pixel, and $[QP+31\times(2^{(N-8)}-1)]$ corresponds to the quantization variable adjusted according to the number of bits per pixel.

Additionally, the quantization coefficient determiner 120 may determine a quantization coefficient in the high frequency domain using the below Equation 3, again noting the high frequency domain indicates the AC component of the transformed pixel values without the DC component.

$$QS=[QP+31\times(2^{(N-8)}-1)]\times 2 \qquad \text{Equation 3}$$

Here, QS corresponds to the quantization coefficient, QP corresponds to the quantization variable defined by the user, N corresponds to the number of bits per pixel, and $[QP+31\times(2^{(N-8)}-1)]$ corresponds to the quantization variable adjusted according to the number of bits per pixel.

The quantization unit 130 may quantize the pixel values transformed by the transformer 110 based on the quantization coefficient determined by the quantization coefficient determiner 120 and output the quantization result to the dequantization unit 140 and the entropy encoder 170.

Further, the quantization unit 130 may quantizes the pixel values using the below Equation 4 when quantizing the DC component or performing uniform quantization of the AC component.

$$q=c/QS \qquad \text{Equation 4}$$

Here, q corresponds to a quantized pixel value, c corresponds to a pixel value transformed by the transformer 110, and QS corresponds to the quantization coefficient.

When performing non-uniform quantization on the high frequency domain, the quantization unit 130 may quantize the pixel values transformed by the transformer 110 by adding an offset value for adjusting the accuracy of quantization thereto. Here, the quantization unit 130 quantizes the pixel values transformed by the transformer 110 using the below Equation 5, for example, when performing non-uniform quantization of the AC component.

$$q=(c+\{\text{sign}(c)\times[QP+31\times(2^{(N-8)}-1)]\times r\})/QS \qquad \text{Equation 5}$$

Here, q corresponds to a quantized pixel value, c corresponds to a pixel value transformed by the transformer 110, QS corresponds to the quantization coefficient, e.g., $QS=[QP+31\times(2^{(N-8)}-1)]\times 2$, and $\{\text{sign}(c)\times[QP+31\times(2^{(N-8)}-1)]\times r\}$ corresponds to an offset for the non-uniform quantization, wherein sign(c)=1 when c>0 sign(c)=0 when c=0, and sign(c)=−1 when c<0, and r is a constant within a range $0 \leq r \leq 1$.

The dequantization unit 140 may dequantize the pixel values quantized by the quantization unit 130 based on the quantization coefficient determined by the quantization coefficient determiner 120 and output the dequantization result to the detransformer 150.

In particular, the dequantization unit 140 may dequantize the quantized pixel values using the below Equation 6 when performing dequantization of the DC component or uniform dequantization of the AC component, for example.

$$c'=q\times QS \qquad \text{Equation 6}$$

Here, c' corresponds to a dequantized pixel value, q corresponds to a quantized pixel value, and QS corresponds to the quantization coefficient.

When performing non-uniform dequantization on the high frequency domain, the dequantization unit 140 may dequantize the quantized pixel values using an offset value for adjusting the accuracy of dequantization. Here, the dequantization unit 140 may dequantize the quantized pixel values using the below Equation 7 when performing non-uniform dequantization of the AC component, for example.

$$c'=q\times QS+\{\text{sign}(c)\times[QP+31\times(2^{(N-8)}-1)]\}$$

Here, c' corresponds to a dequantized pixel value, q corresponds to a quantized pixel value, QS corresponds to the quantization coefficient, i.e., $QS=[QP+31\times(2^{(N-8)}-1)]\times 2$, and $\{\text{sign}(c)\times[QP+31\times(2^{(N-8)}-1)]\}$ corresponds to an offset value for non-uniform quantization.

The detransformer 150 may detransform the pixel values dequantized by the dequantization unit 140 and output the detransform result to the temporal prediction compensator 160.

Thereafter, the temporal prediction compensator 160 may compensate for the detransformed pixel values of the pixel values predicted by the temporal predictor 100.

The entropy encoder 170 may further generate a bitstream of the pixel values quantized by the quantization unit 130.

That is, the entropy encoder 170 generates a bitstream of the quantized pixel values, quantized according to the quantization variable adjusted according to the number of bits per pixel.

Since a characteristic of values quantized when entropy encoding and decoding is performed has a close relationship with the quantization variable, in such a VC-1 system, the DC value is encoded after generating a differential value through Differential Pulse Code Modulation (DPCM) encoding using DC values of neighboring blocks and generating an absolute value DCDifferential of the generated differential value and a sign value DCSign.

According to an embodiment of the present invention, the following illustrates a sequence for performing encoding based on the quantization variable adjusted according to the number of bits per pixel.

```
if(DCDifferential != 0) {
    if(DCDifferential does not present in VLC table) {
        vlc_encode(ESCAPECODE);
        if(QP+31×( 2^(N-8)-1) == 1)
            flc_encode(DCDifferential, 2+N);
        else if(QP+31×( 2^(N-8)-1) == 2)
```

-continued

```
        flc_encode(DCDifferential , 1+N);
      else // QP+31×( 2^(N-8)-1) is > 2
        flc_encode(DCDifferential, N);
      }
    else { // DCDifferential is present in VLC table
        if(QP+31×( 2^(N-8)-1) == 1){
      DCDifferential = DCDifferential + 4× 2^(N-8)-1;
      vlc_encode((DCDifferential)/(4× 2^(N-8)));
      flc_encode(DCDifferential-(DCDifferential/(4× 2^(N-8)))×4
              × 2^(N-8), 2+N-8);
        }
      else if(QP+31×( 2^(N-8)-1) == 2){
      DCDifferential = DCDifferential + 2× 2^(N-8)-1;
        if(QP+31×( 2^(N-8)-1) == 1){
      DCDifferential = DCDifferential + 2× 2^(N-8)-1;
```

-continued

```
      vlc_encode((DCDifferential)/(2× 2^(N-8)));
      flc_encode(DCDifferential-(DCDifferential/(2× 2^(N-8)))×2
              × 2^(N-8), 1+N-8);
        }
      }
      flc_encode(DCSign, 1); // DCSIGN
      }
    else
      vlc_encode(DCDifferential);
```

Here, vlc_encode (symbol) indicates variable length coding (VLC) in which a value "symbol" is transformed to a code corresponding to the value by referring to pre-defined "table," and flc_encode(symbol, num) indicates fixed length coding (FLC) in which the value "symbol" is transformed to bits corresponding to the number "num."

As shown in the above encoding sequence, the encoding with adjusted quantization variable is different from the conventional systems.

An image data decoding system, according to an embodiment of the present invention, will now be described in greater detail with reference to FIG. 2.

Figure 2:
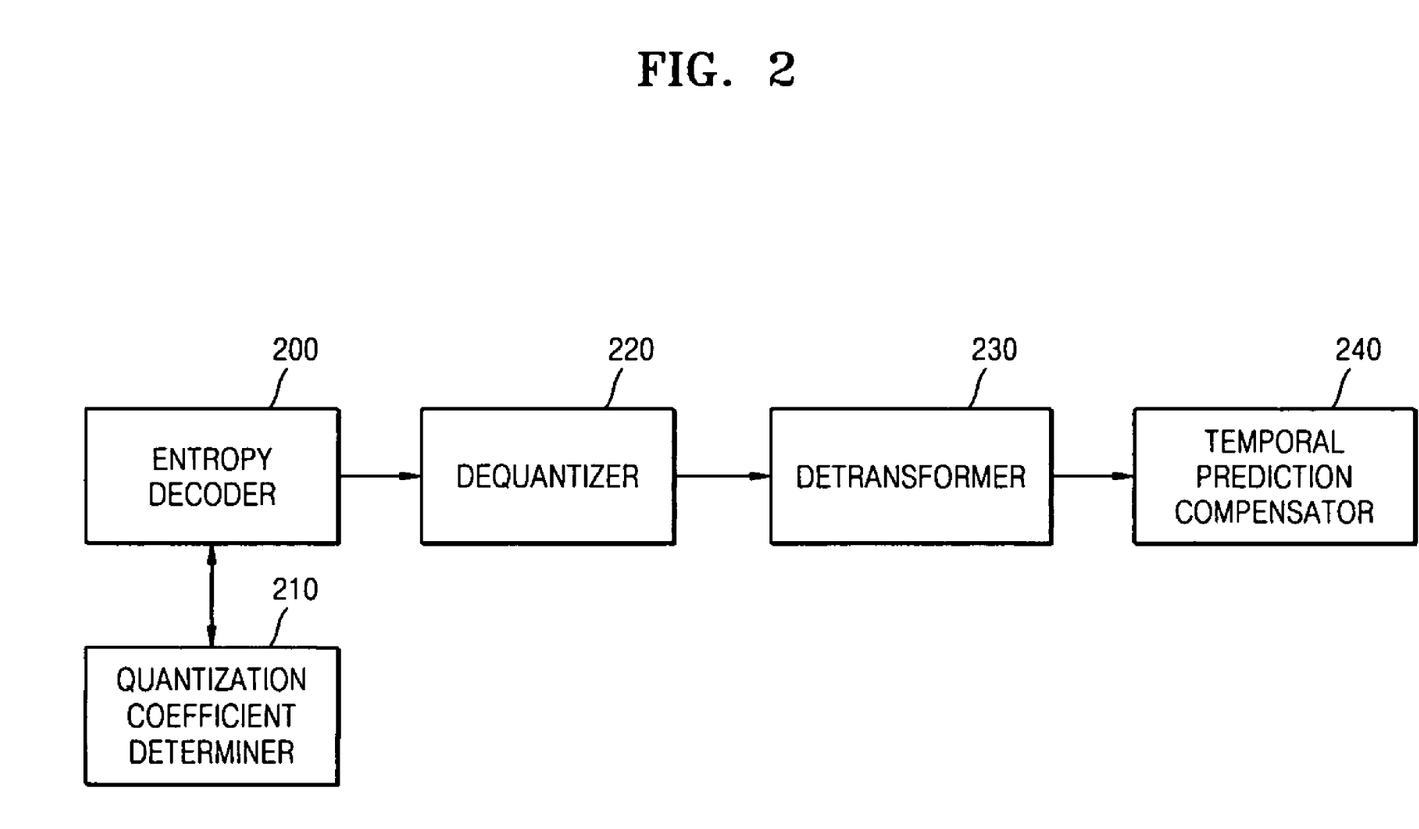
FIG. 2 illustrates an image data decoding system, according to an embodiment of the present invention.

FIG. 2 illustrates an image data decoding system, according to an embodiment of the present invention. Referring to FIG. 2, the image data decoding system may include an entropy decoder 200, a quantization coefficient determiner 210, a dequantizer 220, a detransformer 230, and a temporal prediction compensator 240, for example.

The entropy decoder 200 may decode a bitstream of pixel values of an image and output the decoding result to the quantization coefficient determiner 210.

Here, the entropy decoder 200 may decode a bitstream of pixel values based on a quantization variable adjusted according to the number of bits per pixel, e.g., by the quantization coefficient determiner 210, and output the decoding result to the dequantizer 220.

The entropy decoder 200 may perform a reverse process as the entropy encoder 170 described above, for example.

According to an embodiment of the present invention, the following illustrates a sequence for performing decoding based on a quantization variable adjusted according to the number of bits per pixel.

```
      DCDifferential = vlc_decode( );
        if(DCDifferential != 0) {
        if(DCDifferential == ESCAPECODE) {
          if(QP+31×( 2^(N-8)-1) == 1)
      DCDifferential = flc_decode(2+N); // DCCOEF_ESC
          else if(QP+31×( 2^(N-8)-1) == 2)
      DCDifferential = flc_decode(1+N); // DCCOEF_ESC
          else // QP+31×( 2^(N-8)-1) is > 2
      DCDifferential = flc_decode(N); // DCCOEF_ESC
        }
        else { // DCDifferential is not ESCAPECODE
          if(QP+31×( 2^(N-8)-1) == 1)
      DCDifferential = DCDifferential×4× 2^(N-8) + flc_decode(2+N-8) - (4× 2^(N-8)-1);
          else if(QP+31×( 2^(N-8)-1) == 2)
      DCDifferential = DCDifferential×2× 2^(N-8) + flc_decode(1+N-8) - (2× 2^(N-8)-1);
        }
        DCSign = flc_decode(1); // DCSIGN
          if (DCSign == 1)
        DCDifferential = -DCDifferential
        }
```

As shown in this decoding sequence, the decoding with the adjusted quantization variable is different from the conventional systems.

Thus, the quantization coefficient determiner 210 may determine a quantization coefficient according to the number of bits per pixel of the image by adjusting a quantization variable, e.g., as defined by a user.

The quantization coefficient determiner 210 may adjust the range of quantization variables based on the range of pixel values that is extended, according to the change in the number of bits per pixel. The quantization coefficient determiner 210, thus, may determine a quantization coefficient so that an existing quantization step is maintained constant regardless of a change in the number of bits per pixel, for example. When determining a new quantization coefficient based on the adjusted range of quantization variables and the change in the number of bits per pixel, the quantization coefficient determiner 210 may obtain the quantization coefficient by adding a value proportional to the extended range of pixel values to the quantization variable, e.g., as defined by the user.

The quantization coefficient determiner 210 may determine a quantization coefficient in the low frequency domain using Equation 2, for example, and the quantization coefficient determiner 210 may also determine a quantization coefficient in the high frequency domain using Equation 3, for example.

The dequantizer 220 may then dequantize the pixel values decoded by the entropy decoder 200 based on the quantization coefficient determined by the quantization coefficient determiner 210 and output the dequantization result to the detransformer 230. Thus, the dequantizer 220 may dequantize the pixel values based on the quantization coefficient adjusted according to the number of bits per pixel.

In particular, the dequantization unit 220 may dequantize the pixel values decoded by the entropy decoder 200 using Equation 6, for example, when performing dequantization of the DC component and uniform dequantization of the AC component. When performing non-uniform dequantization on the high frequency domain, the dequantization unit 220 may dequantize the quantized pixel values using an offset value, for example, for adjusting the accuracy of dequantization.

Meanwhile, the dequantization unit 220 dequantizes the pixel values decoded by the entropy decoder 200, e.g., using Equation 7, when performing non-uniform dequantization of the AC component.

The detransformer 230 may then detransform the pixel values dequantized by the dequantization unit 220 and output the detransform result to the temporal prediction compensator 240.

Thereafter, the temporal prediction compensator 240 may compensate for the temporally predicted pixel values of the pixel values detransformed by the detransformer 230.

An image data encoding method, according to an embodiment of the present invention, will now be described in greater detail with reference to FIG. 3.

Figure 3:
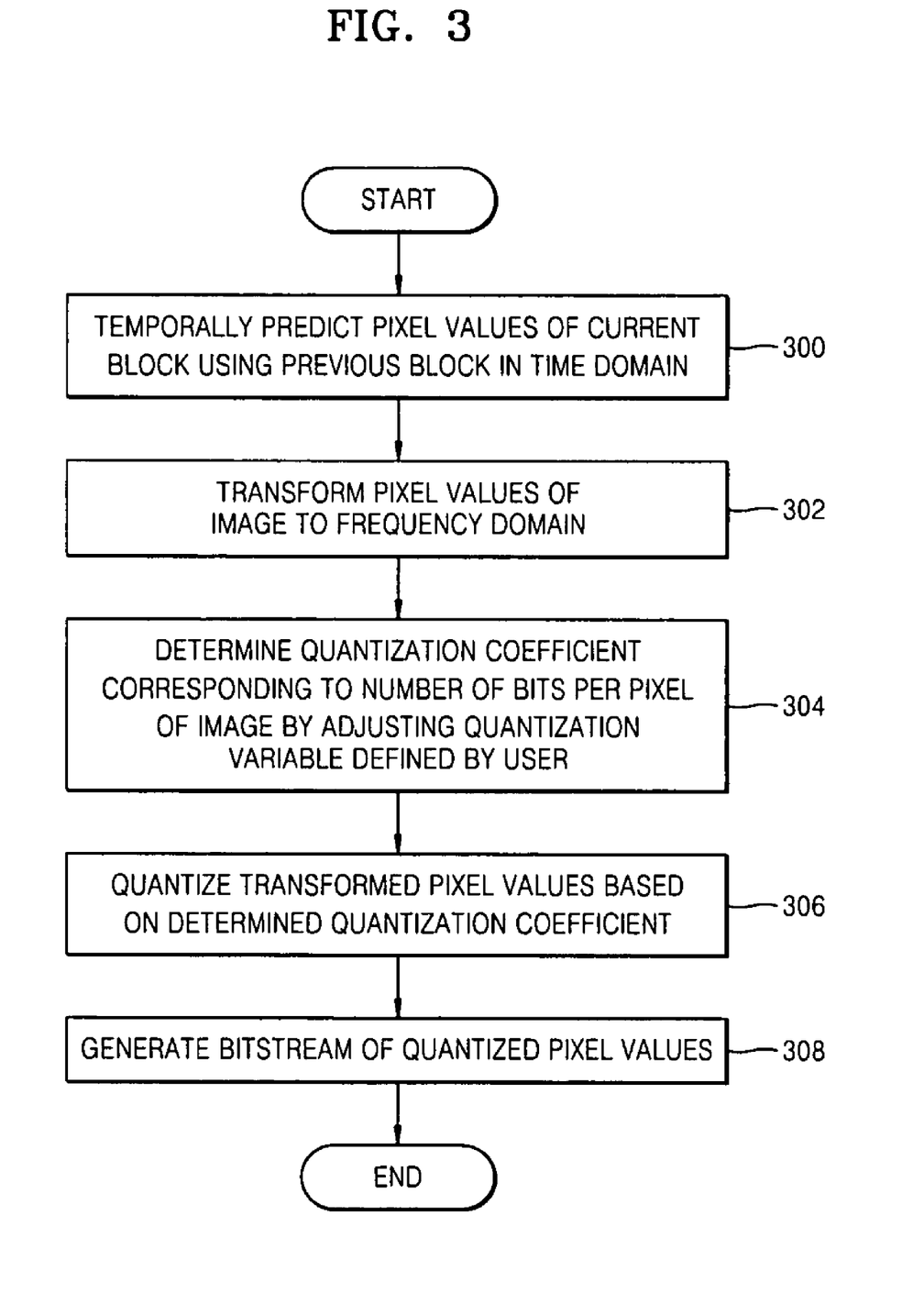
FIG. 3 illustrates an image data encoding method, according to an embodiment of the present invention.

Referring to FIG. 3, in operation 300, pixel values of a current block may be temporally predicted using a previous block in the time domain.

The temporally predicted pixel values of an image may further be transformed to pixel values in the frequency domain, in operation 302.

A quantization coefficient, according to the number of bits per pixel of the image, may be determined, in operation 304, by adjusting a quantization variable defined by a user. In particular, the range of quantization variables may be adjusted based on the range of pixel values that is extended according to the change in the number of bits per pixel. The quantization coefficient may be determined so that an existing quantization process is maintained constant regardless of a change in the number of bits per pixel. When determining a new quantization coefficient based on the adjusted range of quantization variables and a change in the number of bits per pixel, for example, the quantization coefficient may be obtained by adding a value proportional to the extended range of pixel values to the quantization variable, e.g., as defined by the user.

The transformed pixel values may be quantized based on the determined quantization coefficient, in operation 306. The pixel values may further be quantized using Equation 4, for example, when quantization of the DC component or uniform quantization of the AC component is performed. In particular, when performing non-uniform quantization on the high frequency domain, the pixel values may be quantized by adding an offset value for adjusting the accuracy of quantization to the transformed pixel values. When performing non-uniform quantization on the AC component, the pixel values may be quantized using Equation 5 above, for example.

Here, in operation 306, the transformed pixel values may be quantized using Equation 5, for example, when non-uniform quantization of the AC component is performed.

A bitstream of the quantized pixel values may then be generated, in operation 308. In particular, a bitstream of the quantized pixel values can be generated according to a quantization variable adjusted according to the number of bits per pixel. That is, the process of generating the bitstream of the quantized pixel values, e.g., as performed by the above described entropy encoder 170.

An image data decoding method, according to an embodiment of the present invention, will now be described in greater detail with reference to FIG. 4.

Figure 4:
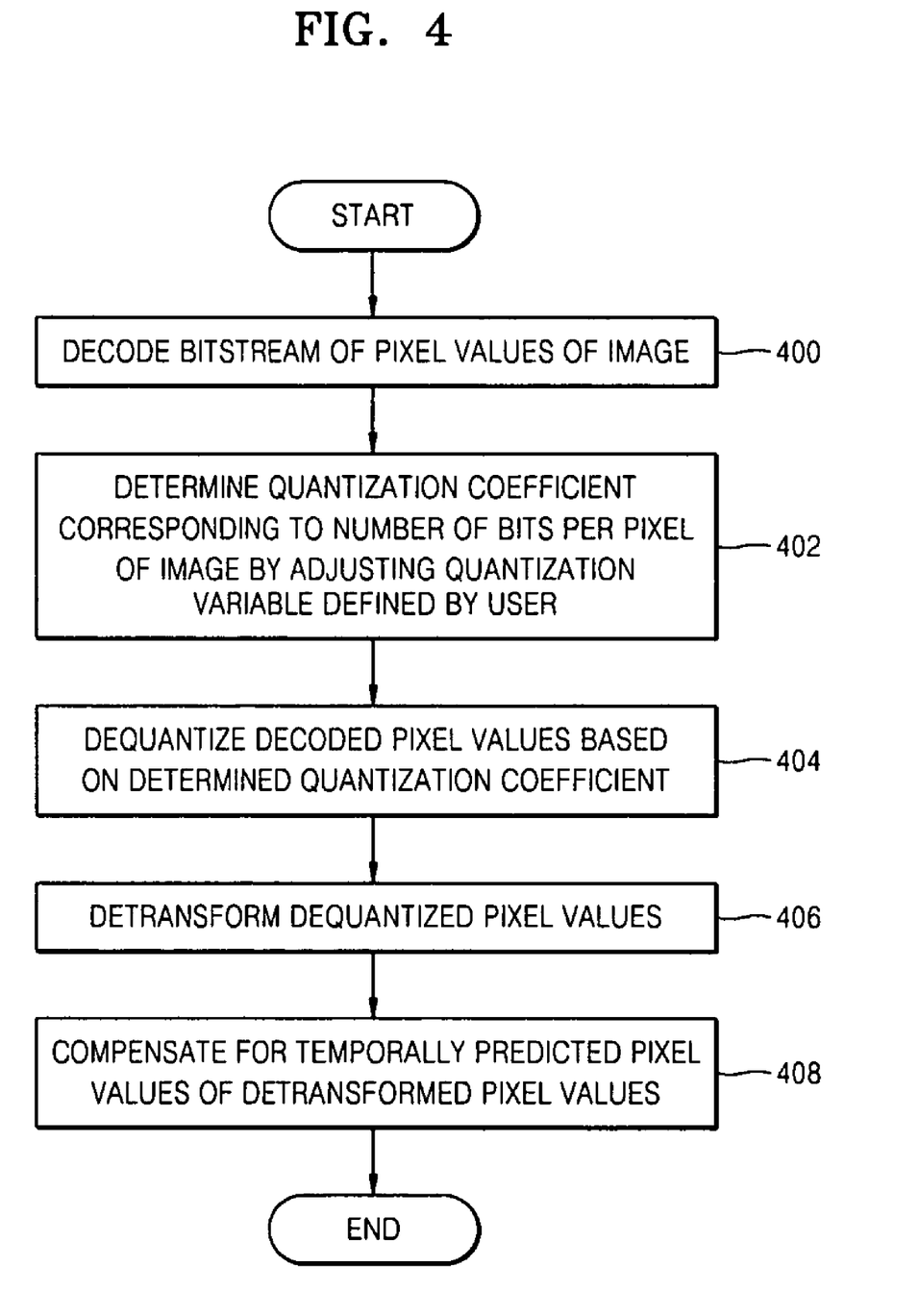
FIG. 4 illustrates an image data decoding method, according to an embodiment of the present invention.

Referring to FIG. 4, in operation 400, a bitstream of pixel values of an image may be decoded. In particular, a bitstream of pixel values may be decoded according to a quantization variable adjusted according to the number of bits per pixel. That is, a bitstream decoding process, e.g., of the entropy decoder 200 described above, may be performed in operation 400.

A quantization coefficient may further be determined according to the number of bits per pixel of the image by adjusting a quantization variable defined by a user, in operation 402. In particular, the range of quantization variables may be adjusted based on the range of pixel values that is extended, according to the change in the number of bits per pixel. The quantization coefficient may be determined so that an existing quantization process is maintained constant regardless of a change in the number of bits per pixel, for example. When determining a new quantization coefficient based on the adjusted range of quantization variables and the change in the number of bits per pixel, the quantization coefficient may be obtained by adding a value proportional to the extended range of pixel values to the quantization variable, e.g., as defined by the user.

The decoded pixel values may be dequantized based on the determined quantization coefficient, in operation 404. Here, the quantized pixel values may be dequantized using Equation 6, for example, when dequantization of the DC component or uniform dequantization of the AC component is performed. When performing non-uniform dequantization on the high frequency domain, the quantized pixel values may be dequantized using an offset value for adjusting the accuracy of dequantization. Further, when performing non-uniform dequantization on the AC component, the pixel values, e.g., as decoded by the aforementioned entropy decoder 200, may be dequantized using Equation 7, for example.

The dequantized pixel values may further be detransformed, in operation 406, and the temporally predicted pixel values of the detransformed pixel values may be compensated for, in operation 408.

An image data encoding system, according to an embodiment of the present invention, will now be described in greater detail again with reference to FIG. 1.

As discussed above, the temporal predictor 100 may temporally predict pixel values of a current block using a previous block in the time domain and output the prediction result to the transformer 110.

Further, the transformer 110 may transform pixel values of an image in the time domain to pixel values in the frequency domain and output the transform result to the quantization coefficient determiner 120.

Here, the quantization coefficient determiner 120 may determine a quantization coefficient corresponding to the number of bits per pixel of the image by adjusting the quantization variable, e.g., as defined by the user, and output the determination result to the quantization unit 130 and the dequantization unit 140. In an embodiment, the quantization coefficient determiner 120 determines the quantization coefficient by multiplying the quantization variable, e.g., defined by the user, by a value proportional to the extended range of pixel values. Here, the quantization coefficient determiner 120 may determine a quantization coefficient according to the changed number of bits per pixel, for example, by linearly mapping a quantization coefficient for a quantization variable before being adjusted with the adjusted quantization variable.

As described above, to make encoding possible even when the number of bits per pixel of the input image is larger than 8 bits per pixel, a process of adapting the quantization coefficient according to the number of bits per pixel is necessary. According to an embodiment, the range of the quantization variable based on N may be adjusted to determine the quantization coefficient, where N denotes the number of bits per pixel of the input image. In particular, a quantization process may be adjusted to have similar image quality as an 8-bit decoded image when an N-bit decoded image is divided by $2^{(N-8)}$ corresponding to the extended bits, for example. That is, when N=10, an image obtained by dividing all pixels of a 10-bit decoded image by $2^{(10-8)}=4$ has similar image quality to the 8-bit decoded image. Accordingly, if an 8-bit quantization variable is 1, a 10-bit quantization variable corresponding to the 8-bit quantization variable would be 4, and if the 8-bit quantization variable is 2, the 10-bit quantization variable corresponding to the 8-bit quantization variable would be 8, and if the 8-bit quantization variable is 3, the 10-bit quantization variable corresponding to the 8-bit quantization variable would be 12, and if the 8-bit quantization variable is 4, the 10-bit quantization variable corresponding to the 8-bit quantization variable would be 16. Herein, 10-bit quantization variables, which does not correspond to the 8-bit quantization variable, linearly increase such as 1, 2, 3, 5, 6, 7, 9, 10, 11, 13, 14, 15, . . . etc., for example.

Here, if it is assumed that the range of the quantization variable is [1, 31] when N is 8, and if it is further assumed that the minimum value of the quantization variable is 1 with respect to N, the maximum value of the quantization variable can be obtained using Equation 1, for example.

In this case, to determine a value of the quantization coefficient based on the quantization variable with respect to N, the below equations may be used.

As described above, the quantization coefficient determiner 120 may determine the quantization coefficient by multiplying the quantization variable, e.g., as defined by the user, by a value proportional to the extended range of pixel values. For example, the value proportional to the extended range of pixel values can be $2^{(N-8)}$, but is not limited thereto.

The quantization coefficient determiner 120 may determine a quantization coefficient in the low frequency domain using the below Equation 8, for example. The low frequency domain indicates the DC component of the transformed pixel values.

Equation 8:
$$\begin{cases} QS = QP \times 2 & (QP \le 2 \times 2^{(N-8)}) \\ QS = 8 \times 2^{(N-8)} & (QP \le 5 \times 2^{(N-8)}) \\ QS = (QP/2) + 6 \times 2^{(N-8)} & \text{(the other range)} \end{cases}$$

Here, QS corresponds to the quantization coefficient, QP corresponds to the quantization variable, e.g., as defined by the user, and N corresponds to the number of bits per pixel.

The quantization coefficient determiner 120 may determine the quantization coefficient in the high frequency domain using the below Equation 9, for example. The high frequency domain indicates the AC component of the transformed pixel values without the DC component.

$$QS = QP \times 2 \qquad \text{Equation 9}$$

Here, QS corresponds to the quantization coefficient, QP corresponds to the quantization variable defined by the user, and N corresponds to the number of bits per pixel.

The quantization unit 130 may quantize the pixel values transformed by the transformer 110 based on the quantization coefficient determined by the quantization coefficient determiner 120 and output the quantization result to the dequantization unit 140 and the entropy encoder 170.

The quantization unit 130 may, thus, quantize the pixel values using Equation 4, for example, when quantizing the DC component or performing uniform quantization of the AC component. When performing non-uniform quantization on the high frequency domain, the quantization unit 120 may quantize the pixel values transformed by the transformer 110 by adding an offset value for adjusting the accuracy of quantization to the transformed pixel values. Further, the quantization unit 130 may quantize the pixel values transformed by the transformer 110 using the below Equation 10, for example, when performing non-uniform quantization of the AC component.

$$q = (c + \{\text{sign}(c) \times QP \times r\})/QS \qquad \text{Equation 10}$$

Here, q corresponds to a quantized pixel value, c corresponds to a pixel value transformed by the transformer 110, QS corresponds to the quantization coefficient, i.e., QS=QP× 2, and {sign(c)×QP×r} corresponds to an offset for the non-uniform quantization, wherein sign(c)=1 when c>0 sign(c)=0 when c=0, and sign(c)=−1 when c<0, and r is a constant within a range $0 \le r \le 1$.

Thereafter, the dequantization unit 140 may dequantize the pixel values quantized by the quantization unit 130 based on the quantization coefficient determined by the quantization coefficient determiner 120, for example, and output the dequantization result to the detransformer 150.

In particular, the dequantization unit 140 may dequantize the quantized pixel values using Equation 6, for example, when performing dequantization of the DC component or uniform dequantization of the AC component. When performing non-uniform dequantization on the high frequency domain, the dequantization unit 140 may, thus, dequantize the quantized pixel values using an offset value for adjusting the accuracy of dequantization.

Further, the dequantization unit 140 may dequantize the quantized pixel values using the below Equation 11, for example, when performing the non-uniform dequantization of the AC component.

$$c' = q \times QS + \{\text{sign}(c) \times QP\} \qquad \text{Equation 11}$$

Here, c' corresponds to a dequantized pixel value, q corresponds to a quantized pixel value, QS corresponds to the quantization coefficient, i.e., QS=QP×2, and {sign(c)×QP} corresponds to an offset value for non-uniform quantization.

The detransformer 150 may detransform the pixel values dequantized by the dequantization unit 140 and output the detransform result to the temporal prediction compensator 160.

The temporal prediction compensator 160 may then compensate for the detransformed pixel values of the pixel values predicted by the temporal predictor 100.

Accordingly, the entropy encoder 170 may generate an output bitstream of the pixel values quantized by the quantization unit 130.

That is, the entropy encoder 170 generates the bitstream of the quantized pixel values according to the quantization variable adjusted according to the number of bits per pixel.

Since a characteristic of values quantized when entropy encoding and decoding is performed has a close relationship with the quantization variable, such a VC-1 system, the DC value is encoded after generating a differential value through DPCM encoding using DC values of neighboring blocks and generating an absolute value DCDifferential of the generated differential value and a sign value DCSign.

According to an embodiment of the present invention, the following illustrates a sequence for performing encoding according to the quantization variable adjusted according to the number of bits per pixel.

```
if(DCDifferential != 0) {
    if(QS≦4× 2^(N-8)) {
        offset2 = N-8;
        if(QS > 2× 2^(N-8)){
            offset = offset1 = 1;
        }
        else{
            offset = 2;
            offset1 = 3;
        }
        DCDifferential2 = (DCDifferential2+offset1)>>offset;
        if(DCDifferential2 does not present in VLC table) {
            vlc_encode(ESCAPECODE);
            flc_encode(DCDifferential, 8+offset+offset2);
            else {
                vlc_encode(DCDifferential2);
        flc_encode(DCDifferential+offset1 - DCDifferential2<<offset,offset);
        }
        else {
            if(DCDifferential does not present in VLC table){
                vlc_encode(ESCAPECODE);
                flc_encode(DCDifferential, 8);
            }
            else{
                vlc_encode(DCDifferential);
            }
            flc_encode(DCSign, 1); // DCSIGN
        }
    else
        vlc_encode(DCDifferential);
```

Here, vlc_encode(symbol) indicates variable length coding (VLC) in which a value "symbol" is transformed to a code corresponding to the value by referring to pre-defined "table," and flc_encode(symbol, num) indicates fixed length coding (FLC) in which the value "symbol" is transformed to bits corresponding to the number "num."

As shown in the encoding sequence described above, the encoding of the adjusted quantization variable is different from the conventional decoding systems.

An image data decoding system, according to an embodiment of the present invention, will now be described in greater detail again with reference to FIG. 2.

Again, the entropy decoder 200 may decode a bitstream of pixel values of an image and output the decoding result to the quantization coefficient determiner 210.

Further, the entropy decoder 200 may decode a bitstream of pixel values based on a quantization variable adjusted according to the number of bits per pixel by the quantization coefficient determiner 210 and outputs the decoding result to the dequantizer 220.

Thus, the entropy decoder 200 may perform a reverse process as the above described entropy encoder 170, for example.

According to an embodiment of the present invention, the following illustrates a sequence for performing decoding according to the quantization variable adjusted according to the number of bits per pixel.

```
DCDifferential = vlc_decode( );
if(DCDifferential != 0) {
    if(DCDifferential == ESCAPECODE) {
        if(QS ≦ 2× 2^(N-8))
            DCDifferential = flc_decode(2+N); // DCCOEF_ESC
        else if (QS ≦ 4× 2^(N-8))
            DCDifferential = flc_decode(1+N); // DCCOEF_ESC
        else // QS > 4× 2^(N-8)
            DCDifferential = flc_decode(8); // DCCOEF_ESC
    }
    else { // DCDifferential is not ESCAPECODE
        if(QS ≦ 2× 2^(N-8))
            DCDifferential = DCDifferential×4 + flc_decode(2) - 3;
        else if (QS ≦ 4× 2^(N-8))
            DCDifferential = DCDifferential×2 + flc_decode(1) - 1;
    }
    DCSign = flc_decode(1); // DCSIGN
    if (DCSign == 1)
        DCDifferential = -DCDifferential
}
```

As shown in the above decoding sequence, the decoding according to the adjusted quantization variable is different from conventional systems.

Here, the quantization coefficient determiner 210 may determine a quantization coefficient according to the number of bits per pixel of the image by adjusting a quantization variable, e.g., as defined by a user, and output the determination result. The quantization coefficient determiner 210 may determine the quantization coefficient by multiplying the quantization variable, e.g., defined by the user, by a value proportional to the extended range of pixel values. Here, the quantization coefficient determiner 210 may further determine the quantization coefficient according to the changed number of bits per pixel by linearly mapping a quantization coefficient for a quantization value before being adjusted with the adjusted quantization variable.

In addition, the quantization coefficient determiner 210 may determine a quantization coefficient in the low frequency domain using Equation 8, for example. The quantization coefficient determiner 210 may further determine a quantization coefficient in the high frequency domain using Equation 9, for example.

Thereafter, the dequantizer 220 may dequantize the pixel values decoded by the entropy decoder 200 based on the quantization coefficient determined by the quantization coefficient determiner 210 and output the dequantization result to the detransformer 230. Thus, the dequantizer 220 may dequantize the pixel values based on the quantization coefficient adjusted according to the number of bits per in the quantization coefficient determiner 210.

In particular, the dequantization unit 220 may dequantize the pixel values decoded by the entropy decoder 200 using Equation 6, for example, when performing dequantization of the DC component and uniform dequantization of the AC component.

Further, the dequantization unit 220 may dequantizes the pixel values decoded by the entropy decoder 200 using Equation 11, for example, when performing non-uniform dequantization of the AC component.

The detransformer 230 may then detransform the pixel values dequantized by the dequantization unit 220 and outputs the detransform result to the temporal prediction compensator 240.

Thereafter, the temporal prediction compensator 240 may compensate for the temporally predicted pixel values of the pixel values detransformed by the detransformer 230.

Accordingly, an image data encoding, method, according to an embodiment of the present invention, will now be described in detail again with reference to FIG. 3.

Referring to FIG. 3, in operation 300, pixel values of a current block may be temporally predicted using a previous block in the time domain.

The temporally predicted pixel values of an image may further be transformed to pixel values in the frequency domain, in operation 302.

A quantization coefficient according to the number of bits per pixel of the image may be determined by adjusting a quantization variable, e.g., as defined by a user, in operation 304. In particular, a quantization coefficient in the low frequency domain may be determined using Equation 8, for example, and a quantization coefficient in the high frequency domain may be determined using Equation 9, for example.

The transformed pixel values may further be quantized based on the determined quantization coefficient, in operation 306. Here, the pixel values may be quantized using Equation 4, for example, when quantization of the DC component or uniform quantization of the AC component is performed. Further, the transformed pixel values may be quantized using Equation 10, for example, when non-uniform quantization of the AC component is performed.

A bitstream of the quantized pixel values may thereafter be generated, in operation 308. In particular, a bitstream of the quantized pixel values may be generated according to a quantization variable adjusted according to the number of bits per pixel. That is, in operation 308, the bitstream of the quantized pixel values, e.g., performed by the above described entropy encoder 170, may be generated.

An image data decoding method, according to an embodiment of the present invention, will now be described in detail again with reference to FIG. 4.

Referring to FIG. 4, in operation 400, a bitstream of pixel values of an image may be decoded. In particular, the bitstream of pixel values may be decoded according to a quantization variable adjusted according to the number of bits per pixel. That is, the bitstream decoding process of the above described entropy decoder 200, for example, may be performed.

A quantization coefficient may be determined, in operation 402, according to the number of bits per pixel of the image by adjusting a quantization variable, e.g., as defined by a user. In particular, a quantization coefficient in the low frequency domain may be determined using Equation 8, for example, and a quantization coefficient in the high frequency domain may be determined using Equation 9, for example.

The decoded pixel values may be dequantized based on the determined quantization coefficient, in operation 404. Here, the quantized pixel values may be dequantized using Equation 6, for example, when dequantization of the DC component or uniform dequantization of the AC component is performed. The decoded pixel values may further be dequantized using Equation 11, for example, when non-uniform dequantization of the AC component is performed.

The dequantized pixel values may then be detransformed, in operation 406, and the temporally predicted pixel values of the detransformed pixel values may then be compensated for, in operation 408.

In addition to the above described embodiments, embodiments of the present invention can also be implemented through computer readable code/instructions in/on a medium, e.g., a computer readable medium. The medium can correspond to any tangible medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media, for example. The media may also be a distributed network, so that the computer readable code is stored/transferred and executed by the distributed network.

As described above, in a system, medium, and method for encoding and/or decoding image data according to embodiments of the present invention, by automatically performing adaptive quantization according to the number of bits per pixel, a high quality image can be obtained with a high compression ratio.

In addition, adaptive encoding and/or decoding according to the number of bits per pixel can be performed by minimally changing the configuration of conventional systems, such as the aforementioned VC-1 standard system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image data encoding system, comprising:
a quantization coefficient determiner to determine a quantization coefficient corresponding to a number of bits per pixel of an image being encoded by adjusting a quantization variable;
a quantization unit to quantize pixel values based on the quantization coefficient; and
an entropy encoder generating a bitstream of the quantized pixel values,
wherein the quantization coefficient determiner adjusts a range of the quantization variables based on a range of pixel values that is extended according to a change in the number of bits per pixel.

2. The image data encoding system of claim 1, further comprising a transformer to transform pixel values of the image in a time domain to the pixel values in a frequency domain and to output the pixel values to the quantization coefficient determiner for determining of the quantization coefficient.

3. The image data encoding system of claim 1, wherein the quantization coefficient determiner determines the quantization coefficient based on the adjusted range of the quantization variables.

4. The image data encoding system of claim 3, wherein the quantization coefficient determiner determines the quantization coefficient so that an existing quantization step, according to the number of bits per pixel, is maintained constant regardless of the change in the number of bits per pixel.

5. The image data encoding system of claim 4, wherein the quantization coefficient determiner determines the quantization coefficient by adding a value proportional to the extended range of pixel values to the quantization variable or by multiplying the quantization variable by a value proportional to the extended range of pixel values.

6. The image data encoding system of claim 4, wherein the quantization coefficient determiner determines the quantization coefficient according to the change in the number of bits by linearly mapping a quantization coefficient for a quantization variable before being adjusted with the adjusted quantization variable.

7. The image data encoding system of claim 1, wherein the quantization variable is defined by a user.

8. A system, comprising:
- a quantization coefficient determiner to determine a quantization coefficient corresponding to a number of bits per pixel of an image by adjusting a quantization variable; and
- a quantization unit to quantize or dequantize pixel values based on the quantization coefficient,
- wherein the quantization coefficient determiner adjusts a range of the quantization variables based on a range of pixel values that is extended according to a change in the number of bits per pixel.

9. The system of claim 8, further comprising a transformer to transform pixel values of the image in a time domain to the pixel values in a frequency domain and to output the pixel values to the quantization coefficient determiner for determining of the quantization coefficient.

10. The system of claim 8, wherein the system is an encoder system, with the system further comprising a bitstream generator to generate the bitstream with the quantized pixel values.

11. The system of claim 8, wherein the system is a decoder system, and the quantization unit is a dequantization unit that dequantizes the pixel values, with the system further comprising an entropy decoder to decode a bitstream containing the pixel values of the image.

12. An image data decoding system, comprising:
- an entropy decoder to decode a bitstream of pixel values of an image;
- a quantization coefficient determiner to determine a quantization coefficient corresponding to a number of bits per pixel of the image by adjusting a quantization variable; and
- a dequantization unit to dequantize pixel values decoded by the entropy decoder based on the determined quantization coefficient
- wherein the quantization coefficient determiner adjusts a range of the quantization variables based on a range of pixel values that is extended according to a change in the number of bits per pixel.

13. The image data decoding system of claim 12, further comprising a detransformer to detransform the dequantized pixel values from a frequency domain into a time domain.

14. The image data decoding system of claim 12, wherein the quantization coefficient determiner determines the quantization coefficient based on the adjusted range of the quantization variables.

15. The image data decoding system of claim 14, wherein the quantization coefficient determiner determines the quantization coefficient so that an existing quantization step, according to the number of bits per pixel, is maintained constant regardless of the change in the number of bits per pixel.

16. The image data decoding system of claim 15, wherein the quantization coefficient determiner determines the quantization coefficient by adding a value proportional to the extended range of pixel values to the quantization variable or by multiplying the quantization variable by a value proportional to the extended range of pixel values.

17. The image data decoding system of claim 15, wherein the quantization coefficient determiner determines the quantization coefficient according to the change in the number of bits by linearly mapping a quantization coefficient for a quantization variable before being adjusted with the adjusted quantization variable.

18. The image data decoding system of claim 12, wherein the dequantization unit dequantizes the pixel values based on the quantization coefficient adjusted according to the number of bits per pixel in the quantization coefficient determiner.

19. The image data decoding system of claim 12, wherein the quantization variable is defined by a user.

20. An image data encoding method, comprising:
- determining a quantization coefficient corresponding to a number of bits per pixel of an image by adjusting a quantization variable;
- quantizing pixel values of the image based on the determined quantization coefficient; and
- generating a bitstream of the quantized pixel values,
- wherein, in the determining of the quantization coefficient, a range of the quantization variables is adjusted based on a range of pixel values that is extended according to a change in the number of bits per pixel.

21. The image data encoding method of claim 20, further comprising transforming pixel values of the image in a time domain to the pixel values in a frequency domain for the determining of the quantization coefficient.

22. The image data encoding method of claim 20, wherein, in the determining of the quantization coefficient, the quantization coefficient is determined based on the adjusted range of the quantization variables.

23. The image data encoding method of claim 22, wherein, in the determining of the quantization coefficient, the quantization coefficient is determined so that an existing quantization step, according to the number of bits per pixel, is maintained constant regardless of the change in the number of bits per pixel.

24. The image data encoding method of claim 23, wherein, in the determining of the quantization coefficient, the quantization coefficient is determined by adding a value proportional to the extended range of pixel values to the quantization variable or by multiplying the quantization variable by a value proportional to the extended range of pixel values.

25. The image data encoding method of claim 23, wherein, in the determining of the quantization coefficient, the quantization coefficient according to the change in the number of bits is determined by linearly mapping a quantization coefficient for a quantization variable before being adjusted with the adjusted quantization variable.

26. The image data encoding method of claim 20, wherein the quantization variable is defined by a user.

27. At least one non-transitory computer readable medium embodied with computer readable code to control at least one processing device to implement the method of claim 20.

28. An image data decoding method, comprising:
- decoding a bitstream of pixel values of an image;
- determining a quantization coefficient corresponding to a number of bits per pixel of the image by adjusting a quantization variable; and
- dequantizing the pixel values based on the determined quantization coefficient,
- wherein, in the determining of the quantization coefficient, a range of the quantization variables is adjusted based on a range of pixel values that is extended according to a change in the number of bits per pixel.

29. The image data decoding method of claim 28, further comprising detransforming the dequantized pixel values from a frequency domain into a time domain.

30. The image data decoding method of claim 28, wherein, in the determining of the quantization coefficient, the quantization coefficient is determined based on the adjusted range of the quantization variables.

31. The image data decoding method of claim 30, wherein, in the determining of the quantization coefficient, the quantization coefficient is determined so that an existing quantization step, according to the number of bits per pixel, is maintained constant regardless of the change in the number of bits per pixel.

32. The image data decoding method of claim 31, wherein, in the determining of the quantization coefficient, the quantization coefficient is determined by adding a value proportional to the extended range of pixel values to the quantization variable or by multiplying the quantization variable by a value proportional to the extended range of pixel values.

33. The image data decoding method of claim 31, wherein, in the determining of the quantization coefficient, the quantization coefficient according to the change in the number of bits is determined by linearly mapping a quantization coefficient for a quantization variable before being adjusted with the adjusted quantization variable.

34. The image data decoding method of claim 28, wherein, in the dequantizing of the decoded pixel values, the pixel values are dequantized based on the quantization coefficient adjusted according to the number of bits per pixel.

35. The image data decoding method of claim 28, wherein the quantization variable is defined by a user.

36. At least one non-transitory computer readable medium embodied with computer readable code to control at least one processing device to implement the method of claim 28.

* * * * *

UNITED STATES PATENT AND TRADEMARK OFFICE
CERTIFICATE OF CORRECTION

| | | |
|---|---|---|
| PATENT NO. | : 7,848,586 B2 | Page 1 of 1 |
| APPLICATION NO. | : 11/484699 | |
| DATED | : December 7, 2010 | |
| INVENTOR(S) | : Wooshik Kim et al. | |

It is certified that error appears in the above-identified patent and that said Letters Patent is hereby corrected as shown below:

Column 18, Line 36, in Claim 1, delete "variables" and insert --variable--, therefor.

Column 18, Line 48, in Claim 3, delete "variables." and insert --variable.--, therefor.

Column 19, Line 37, in Claim 14, delete "variables" and insert --variable--, therefor.

Column 19, Line 46, in Claim 14, delete "variables." and insert --variable.--, therefor.

Column 20, Line 12 (Approx.), in Claim 20, delete "variables" and insert --variable--, therefor.

Column 20, Line 22 (Approx.), in Claim 22, delete "variables." and insert --variable.--, therefor.

Column 20, Line 55, in Claim 28, delete "variables" and insert --variable--, therefor.

Column 20, Line 64, in Claim 30, delete "variables." and insert --variable.--, therefor.

Signed and Sealed this
Twenty-second Day of March, 2011

David J. Kappos
*Director of the United States Patent and Trademark Office*